United States Patent
Hays et al.

(10) Patent No.: US 6,556,931 B1
(45) Date of Patent: Apr. 29, 2003

(54) APPARATUS AND METHOD FOR COMPENSATING MASS FLOW RATE OF A MATERIAL WHEN THE DENSITY OF THE MATERIAL CAUSES AN UNACCEPTABLE ERROR IN FLOW RATE

(75) Inventors: Paul J. Hays, Lafayette, CO (US); Andrew T. Patten, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 43 days.

(21) Appl. No.: 09/705,995

(22) Filed: Nov. 3, 2000

(51) Int. Cl.[7] .............................................. G01F 17/00
(52) U.S. Cl. ......................................... 702/54; 702/100
(58) Field of Search ............................. 702/54, 56, 48, 702/100, 45; 73/861.354, 861.355, 861.356, 434, 32, 861.18

(56) References Cited

U.S. PATENT DOCUMENTS

| | | |
|---|---|---|
| RE31,450 E | 11/1983 | Smith |
| 4,491,025 A | 1/1985 | Smith et al. |
| 5,497,665 A | 3/1996 | Cage et al. |
| 5,576,500 A | 11/1996 | Cage et al. |
| 5,687,100 A * | 11/1997 | Buttler et al. ............... 702/100 |
| 5,827,979 A | 10/1998 | Schott et al. |
| 6,092,409 A | 7/2000 | Patten et al. |
| 6,367,336 B1 * | 4/2002 | Martina et al. ............... 73/1.16 |

\* cited by examiner

*Primary Examiner*—John Barlow
*Assistant Examiner*—Anthony Dougherty
(74) *Attorney, Agent, or Firm*—Faegre & Benson LLP (57) ABSTRACT

An apparatus and method for determining a density compensated flow rate of a material flowing through a vibrating conduit. Signals are received from sensors affixed to the vibrating conduit. An uncompensated flow rate of said material is then calculated from the signals. A density compensation factor is then determined from the uncompensated flow rate and non-linear information relating density to errors in flow rate. The density compensated flow rate is then determined by applying the density compensation factor to the uncompensated flow rate.

21 Claims, 5 Drawing Sheets

APPARATUS AND METHOD FOR COMPENSATING MASS FLOW RATE OF A MATERIAL WHEN THE DENSITY OF THE MATERIAL CAUSES AN UNACCEPTABLE ERROR IN FLOW RATE

FIELD OF THE INVENTION

This invention relates to the calculation of a mass flow rate of material flowing through a Coriolis flowmeter. More particularly, this invention relates to compensating a measured flow rate for error in the flow rate caused by the density of the material being measured. Still more particularly, this invention relates to determining when the density of a material is causing an unacceptable error in the mass flow rate and compensating for the error caused by density in the flow rate.

Problem

It is known to use Coriolis effect mass flowmeters to measure mass flow and other information of materials flowing through a pipeline as disclosed in U.S. Pat. No. 4,491,025 issued to J. E. Smith, et al. of Jan. 1, 1985 and Re. 31,450 to J. E. Smith of Feb. 11, 1982. These flowmeters have one or more flow tubes of a curved configuration. Each flow tube configuration in a Coriolis mass flowmeter has a set of natural vibration modes, which may be of a simple bending, torsional, radial, or coupled type. Each flow tube is driven to oscillate at resonance in one of these natural modes. The natural vibration modes of the vibrating, material filled systems are defined in part by the combined mass of the flow tubes and the material within the flow tubes. Material flows into the flowmeter from a connected pipeline on the inlet side of the flowmeter. The material is then directed through the flow tube or flow tubes and exits the flowmeter to a pipeline connected on the outlet side.

A driver applies a force to the flow tube. The force causes the flow tube to oscillate. When there is no material flowing through the flowmeter, all points along a flow tube oscillate with an identical phase. As a material begins to flow through the flow tube, Coriolis accelerations cause each point along the flow tube to have a different phase with respect to other points along the flow tube. The phase on the inlet side of the flow tube lags the driver, while the phase on the outlet side leads the driver. Sensors are placed at two different points on the flow tube to produce sinusoidal signals representative of the motion of the flow tube at the two points. A phase difference of the two signals received from the sensors is calculated in units of time.

The phase difference between the two sensor signals is proportional to the mass flow rate of the material flowing through the flow tube or flow tubes. The mass flow rate of the material is determined by multiplying the phase difference by a flow calibration factor. This flow calibration factor is determined by material properties and cross sectional properties of the flow tube.

It is a problem that properties of a material may effect mass flow rates measured by Coriolis flowmeters. Some properties of a material that may effect measured flow rates include density, temperature, pressure, and viscosity. In most cases, a Coriolis flowmeter is designed to be insensitive to the errors caused by these properties. In other cases, meter electronics compensate for errors in the measured mass flow rate caused by these properties. For example, meter electronics commonly compensate for errors caused by the temperature and pressure of a material.

Sometimes the error caused by the properties of a material are insignificant under normal operating conditions and the error in flow rate is not corrected. However, a property of a material may cause unacceptable errors after a certain threshold is surpassed. For example, the density of a material often does not affect the flow rate in most flow meters at most densities. However, in low flow rate Coriolis flowmeters, it has been observed that density of the material effects the measured flow rate of the material after a certain threshold. For purposes of this discussion, low flow rate is 5 lbs./minute or less. At this time, it is unknown what causes these errors.

Therefore, it is desirable to determine when the density of the measured material surpasses a threshold and to compensate for the error in flow rate caused by the density.

Solution

The above and other problems are solved and an advance in the art is made by the provision of a method and apparatus for compensating for errors in measured mass flow rates caused by density in a Coriolis flowmeter. One advantage of this invention is that errors in a measured flow rate attributable to density are corrected. A second advantage of this invention is that the compensation is more accurate than other systems as non-linear equations that more precisely fit measured data are used to determine a compensation factor. A third advantage of this invention that the compensation may only occur after the density has surpassed a certain threshold where the error caused by density surpasses an unacceptable level. This reduces the amount of computation needed to provide an accurate flow rate.

A determination of a mass flow rate that is compensated for density in accordance with this invention is performed in the following manner. First a material flows through a vibrating conduit in a Coriolis flowmeter. The conduit is vibrated and sensors affixed to the conduit generate signals representing the motion of the conduit. Signals from sensors affixed to the vibrating conduit are received by the meter electronics. An uncompensated flow rate of the material is then calculated by the meter electronics from the received signals. A density compensation factor is then determined using uncompensated flow rate and non-linear information relating density to errors in flow rate. A density compensated flow rate is then generated by applying the density compensation factor to the uncompensated flow rate.

In accordance with this invention, the meter electronics may also calculate a density of the material from the signals received from the sensors. The calculated density then may be compared to a threshold to determine whether the density surpasses a threshold value. If the density does surpass the threshold value the density compensated flow rate is generated. Otherwise the uncompensated flow rate is output.

In an alternative embodiment, a linear density compensation factor may be calculated using the uncompensated flow rate and linear information relating errors in the mass flow rate to the density of the material if the threshold is not exceeded. The compensated flow rate can be calculated by applying said linear density compensation to said uncompensated mass flow rate.

In accordance with this invention the density compensation factor may be determined by inserting the uncompensated flow rate into a N order polynomial equation relating density to flow rate error data wherein N is greater than 1. The N order polynomial is a curve fit of density to error rate in measured mass flow. The polynomial may be generated by performing an N order curve fit of the density to flow rate error data wherein N is greater than 1.

DESCRIPTION OF THE DRAWINGS

The above and other advantages and aspects of this invention are explained in the detailed description and following drawings.

DETAILED DESCRIPTION

Figure 1:
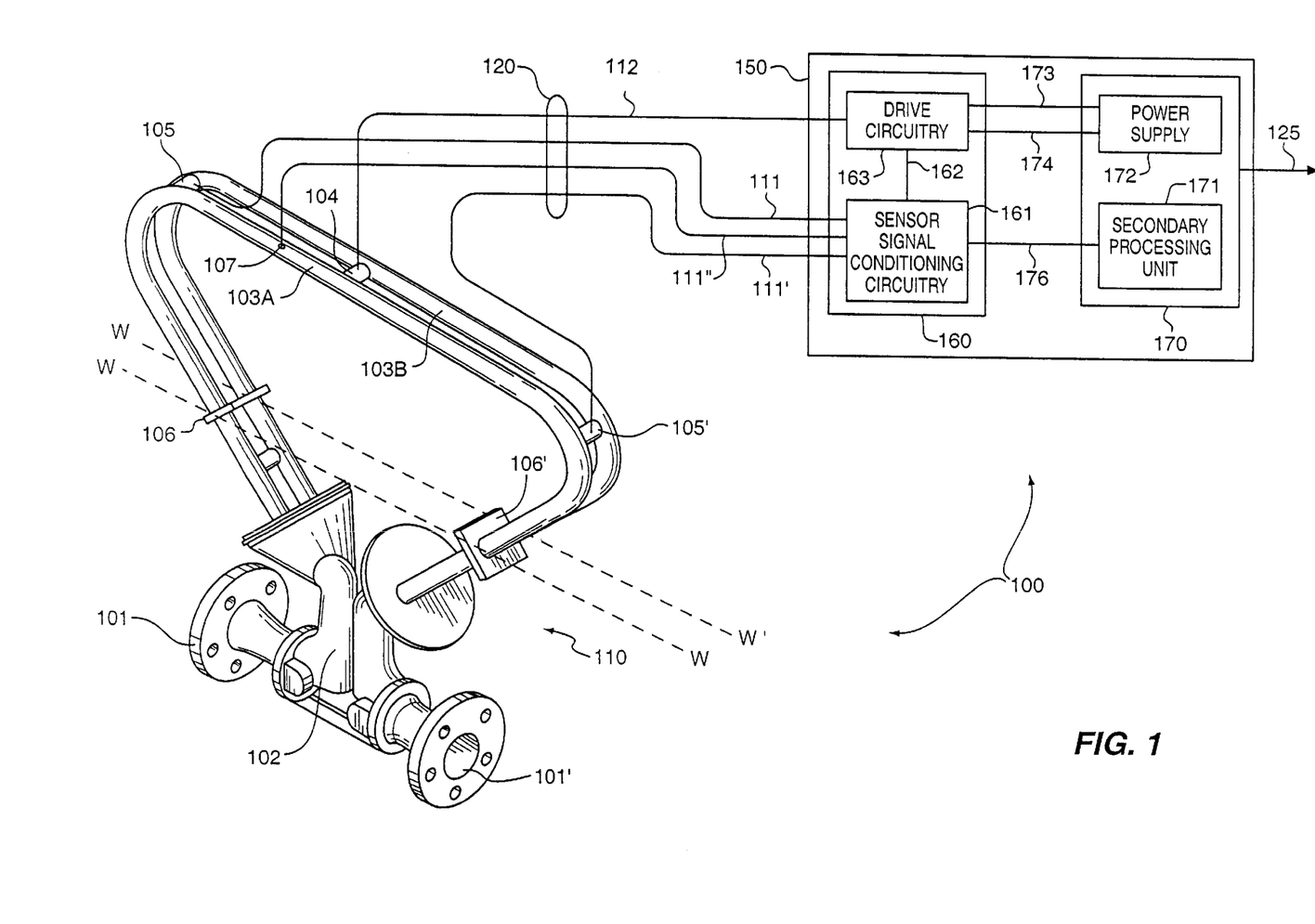
FIG. 1 illustrating a Coriolis flowmeter that incorporates the method and apparatus of this invention.

The present invention relates to providing a mass flow rate measurement from a Coriolis flowmeter that compensates for errors in the flow rate caused by the density of a material. FIG. 1 illustrates an exemplary Coriolis flowmeter that may provide a compensated mass flow rate in accordance with this invention. Coriolis flowmeter 100 includes a flowmeter assembly 110 and meter electronics 150. Meter electronics 150 are connected to meter assembly 110 via leads 120 to provide for example, but not limited to, density, mass-flow-rate, volume-flow-rate, and totalized mass-flow rate information over a path 125. A Coriolis flowmeter structure is described although it should be apparent to those skilled in the art that the present invention could be practiced in conjunction with any apparatus having loads requiring currents of alternating voltage.

A Coriolis flowmeter structure is described although it should be apparent to those skilled in the art that the present invention could be practiced in conjunction with any apparatus having a vibrating conduit to measure properties of material flowing through the conduit. A second example of such an apparatus is a vibrating tube densitometer which does not have the additional measurement capability provided by Coriolis mass flowmeters.

Meter assembly 110 includes a pair of flanges 101 and 101', manifold 102 and conduits 103A and 103B. Driver 104, pick-off sensors 105 and 105', and temperature sensor 107 are connected to conduits 103A and 103B. Brace bars 106 and 106' serve to define the axis W and W' about which each conduit oscillates.

When Coriolis flowmeter 100 is inserted into a pipeline system (not shown) which carries the process material that is being measured, material enters flowmeter assembly 110 through flange 101, passes through manifold 102 where the material is directed to enter conduits 103A and 103B. The material then flows through conduits 103A and 103B and back into manifold 102 from where it exits meter assembly 110 through flange 101'.

Conduits 103A and 103B are selected and appropriately mounted to the manifold 102 so as to have substantially the same mass distribution, moments of inertia and elastic modules about bending axes W—W and W'—W', respectively. The conduits 103A–103B extend outwardly from the manifold in an essentially parallel fashion.

Conduits 103A–103B are driven by driver 104 in opposite directions about their respective bending axes W and W' and at what is termed the first out of phase bending mode of the flowmeter. Driver 104 may comprise any one of many well known arrangements, such as a magnet mounted to conduit 103A and an opposing coil mounted to conduit 103B and through which an alternating current is passed for vibrating both conduits. A suitable drive signal is applied by meter electronics 150 to driver 104 via path 112.

Pick-off sensors 105 and 105' are affixed to at least one of conduits 103A and 103B on opposing ends of the conduit to measure oscillation of the conduits. As the conduit 103A–103B vibrates, pick-off sensors 105–105' generate a first pick-off signal and a second pick-off signal. The first and second pick-off signals are applied to paths 111 and 111'. The driver velocity signal is applied to path 112.

Temperature sensor 107 is affixed to at least one conduit 103A and/or 103B. Temperature sensor 107 measures the temperature of the conduit in order to modify equations for the temperature of the system. Path 111" carries temperature signals from temperature sensor 107 to meter electronics 150.

Meter electronics 150 receives the first and second pick-off signals appearing on paths 111 and 111', respectively. Meter electronics 150 processes the first and second velocity signals to compute the mass flow rate, the density, or other property of the material passing through flowmeter assembly 110. This computed information is applied by meter electronics 150 over path 125 to a utilization means (not shown). It is known to those skilled in the art that Coriolis flowmeter 100 is quite similar in structure to a vibrating tube densitometer. Vibrating tube densitometers also utilize a vibrating tube through which fluid flows or, in the case of a sample-type densitometer, within which fluid is held. Vibrating tube densitometers also employ a drive system for exciting the conduit to vibrate. Vibrating tube densitometers typically utilize only single feedback signal since a density measurement requires only the measurement of frequency and a phase measurement is not necessary. The descriptions of the present invention herein apply equally to vibrating tube densitometers.

In Coriolis flowmeter 100, the meter electronics 150 are physically divided into 2 components a host system 170 and a signal conditioner 160. In conventional meter electronics, these components are housed in one unit.

Signal conditioner 160 includes drive circuitry 163 and sensor signal conditioning circuitry 161. One skilled in the art will recognize that in actuality drive circuitry 163 and pick-off conditioning circuitry 161 may be separate analog circuits or may be separate functions provided by a digital signal processor or other digital components. Drive circuitry 163 generates a drive signal and applies an alternating drive current to driver 104 via path 112 of path 120. The circuitry of the present invention may be included in drive circuitry 163 to provide an alternating current to driver 104.

In actuality, path 112 is a first and a second lead. Drive circuitry 163 is communicatively connected to sensor signal conditioning circuitry 161 via path 162. Path 162 allows drive circuitry to monitor the incoming pick-off signals to adjust the drive signal. Power to operate drive circuitry 163 and sensor signal conditioning circuitry 161 is supplied from host system 170 via a first wire 173 and a second wire 174. First wire 173 and second wire 174 may be a part of a conventional 2-wire, 4-wire cable, or a portion of a multi-pair cable.

Sensor signal conditioning circuitry 161 receives input signals from first pick-off 105, second pick-off 105', and temperature sensor 107 via paths 111, 111' and 111". Sensor signal conditioning circuitry 161 determines the frequency of the pick-off signals and may also determine properties of a material flowing through conduits 103A–103B. After the frequency of the input signals from pick-off sensors 105–105' and properties of the material are determined, parameter signals carrying this information are generated and transmitted to a secondary processing unit 171 in host system 170 via path 176. In a preferred embodiment, path 176 includes 2 leads. However, one skilled in the art will recognize that path 176 may be carried over first wire 173 and second wire 174 or over any other number of wires.

Host system 170 includes a power supply 172 and secondary processing unit 171. Power supply 172 receives electricity from a source and converts the received electricity to the proper power needed by the system. Secondary processing unit 171 receives the parameter signals from pick-off signal conditioning circuitry 161 and then may perform processes needed to provide properties of the material flowing through conduits 103A–103B needed by a user. Such properties may include but are not limited to density, mass flow rate, and volumetric flow rate.

Figure 5:
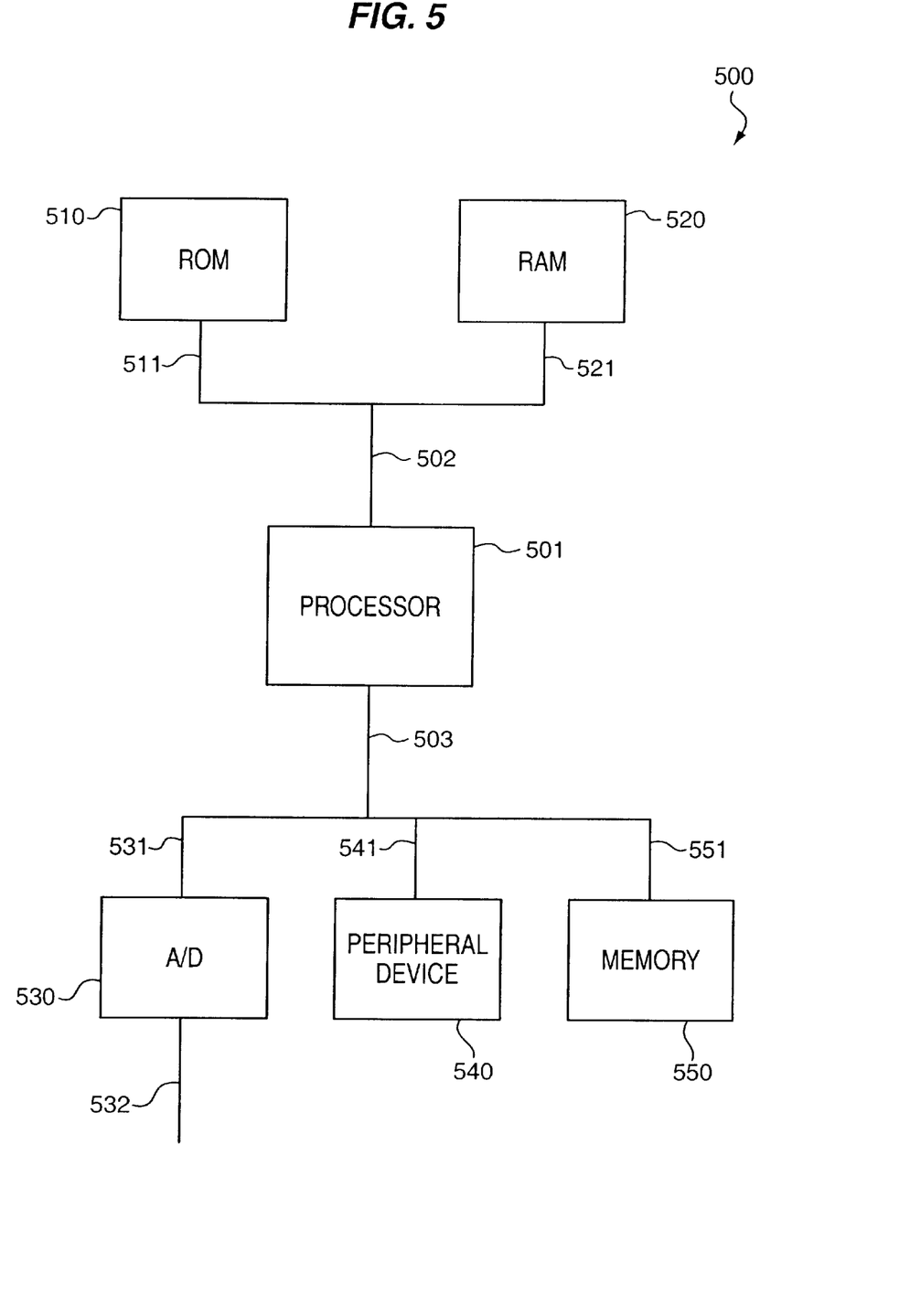
FIG. 5 illustrating a processor.

The following invention is implemented by a processing unit. Either a digital signal processor in signal conditioner 160 or secondary processing unit 171 may implement the present invention. FIG. 5 illustrates a conventional processing unit that is operative to implement this invention.

Processing system 500 includes a Central Processing Unit (CPU) 501. CPU 501 is a processor, microprocessor, or combination of processor and/or microprocessor which execute instructions that are stored in memory. Memory bus 502 connects CPU 501 to memory needed to execute instructions. Non-volatile memory such as Read Only Memory (ROM) 510 is connected to memory bus 502 via path 511. ROM 510 stores configuration instructions and other instructions needed to properly operate processing system 500. A volatile memory, such Random Access Memory 520, is connected to memory bus 502 via path 521. RAM 520 stores instructions and data needed to perform applications executed by CPU 501.

Input/ Output (I/O) bus 503 connects CPU 501 to other devices needed to execute instructions. Analog to Digital (A/D) convertor 530 allow CPU 501 to receive signals from analog circuitry such as pick-off sensors 105–105' of FIG. 1. A/D convertor 530 is connected to I/O bus 503 and receives analog signals from other circuitry (Not Shown) via path 532. Peripheral device 540 is another device that performs a required function for processing system 500 to provide data to CPU 501. Peripheral device 540 is connected to I/O bus 503 via path 541. Memory 550 is a device that provides extra data storage capability to processing system 500, such as a disk drive and disk. Memory 550 is connected to I/O bus 503 via path 551.

It is a problem that the mass flow measurement provided by a Coriolis flowmeter such as Coriolis flowmeter 100 may be affected by properties of the measured material. One such property is density of the material. Small Coriolis flowmeters are particularly susceptible to errors caused by the density of the measured material. For purposes of this discussion a small Coriolis flowmeter is a flowmeter that has flow tubes with a diameter of 0.130 inches. An example of such a flowmeter is the CMF 010 Coriolis Flowmeter produced by Micro Motion INC. of Boulder, Colo.

Figure 2:
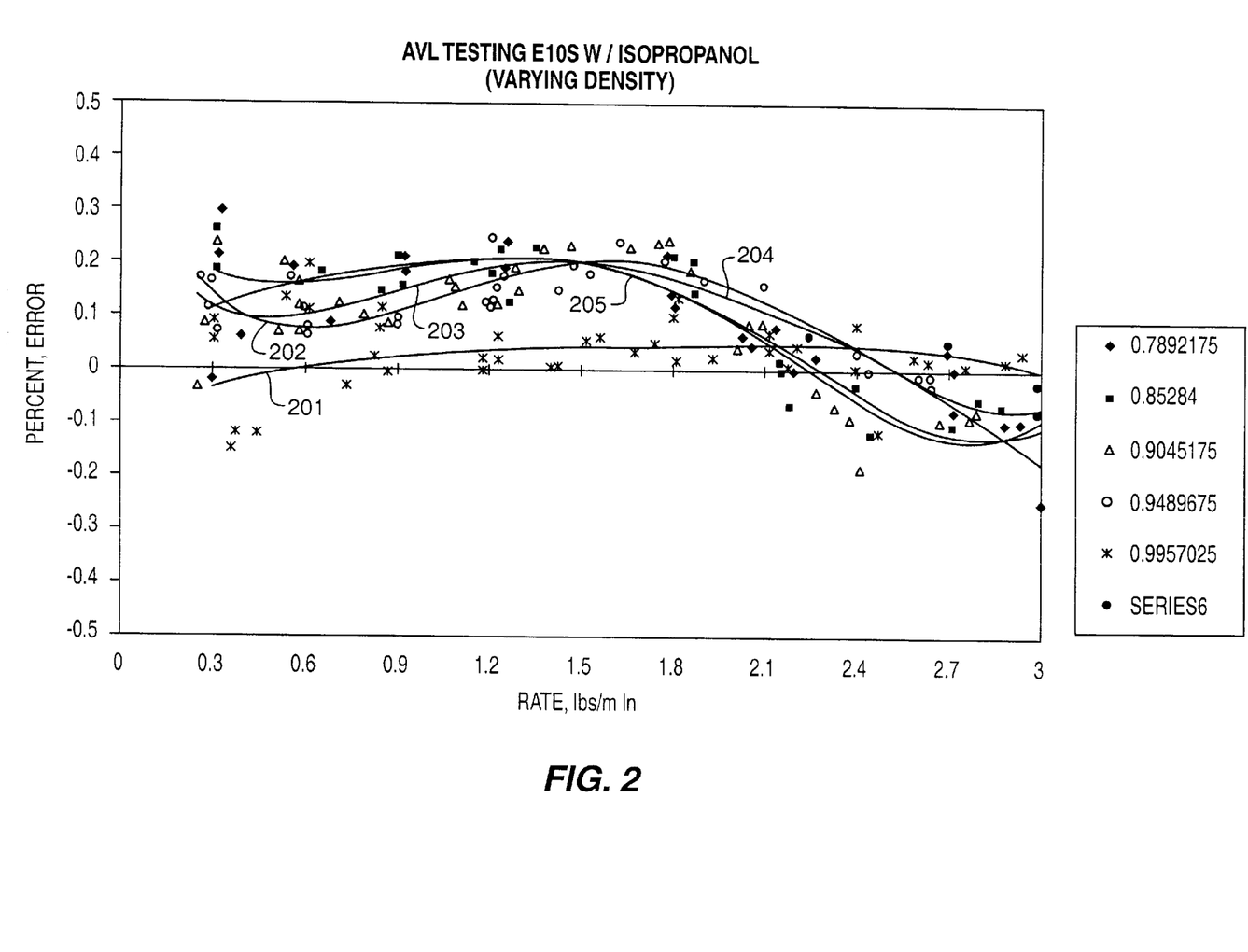
FIG. 2 illustrating a chart showing error rates compared to flow rates for varying densities.

FIG. 2 is an illustration of a plotting of error in flow rates of materials having varying densities. Line 201 represents error in uncompensated flow rates as the flow rate changes for a material having a density 0.9957. Line 202 represents the error in uncompensated flow rates as flow rates change for materials having a density of 0.9489. Line 203 represents the error in uncompensated flow rates for material having a density of 0.85284. Line 204 represents error rates of uncompensated flow rates for a material having a density of 0.78922. Line 205 represents the error in uncompensated flow rates for materials having a density of 0.90452.

As can be seen from FIG. 2, material having densities proximate to 1.0 cause less percentage error. While densities that are not proximate 1.0 tend to have a percentage of error that is greater than 0.1%.

From the graph of FIG. 2, one skilled in the art can see that densities that are not proximate to 1 cause a small flowmeter to provide inaccurate flow rates. The present invention corrects the flow rate by multiplying the measured flow rate by a density compensation factor.

The density compensation factor may be calculated in any of the following manners: a look up for compensation factors based upon uncompensated flow rates, comparing density to a least squared polynomial fit of uncompensated density, or a two dimensional least square curve fit of uncompensated density and mass flow rate. One skilled in the art will recognize that other data fitting methods may be used to determine the density compensation factor.

Figure 3:
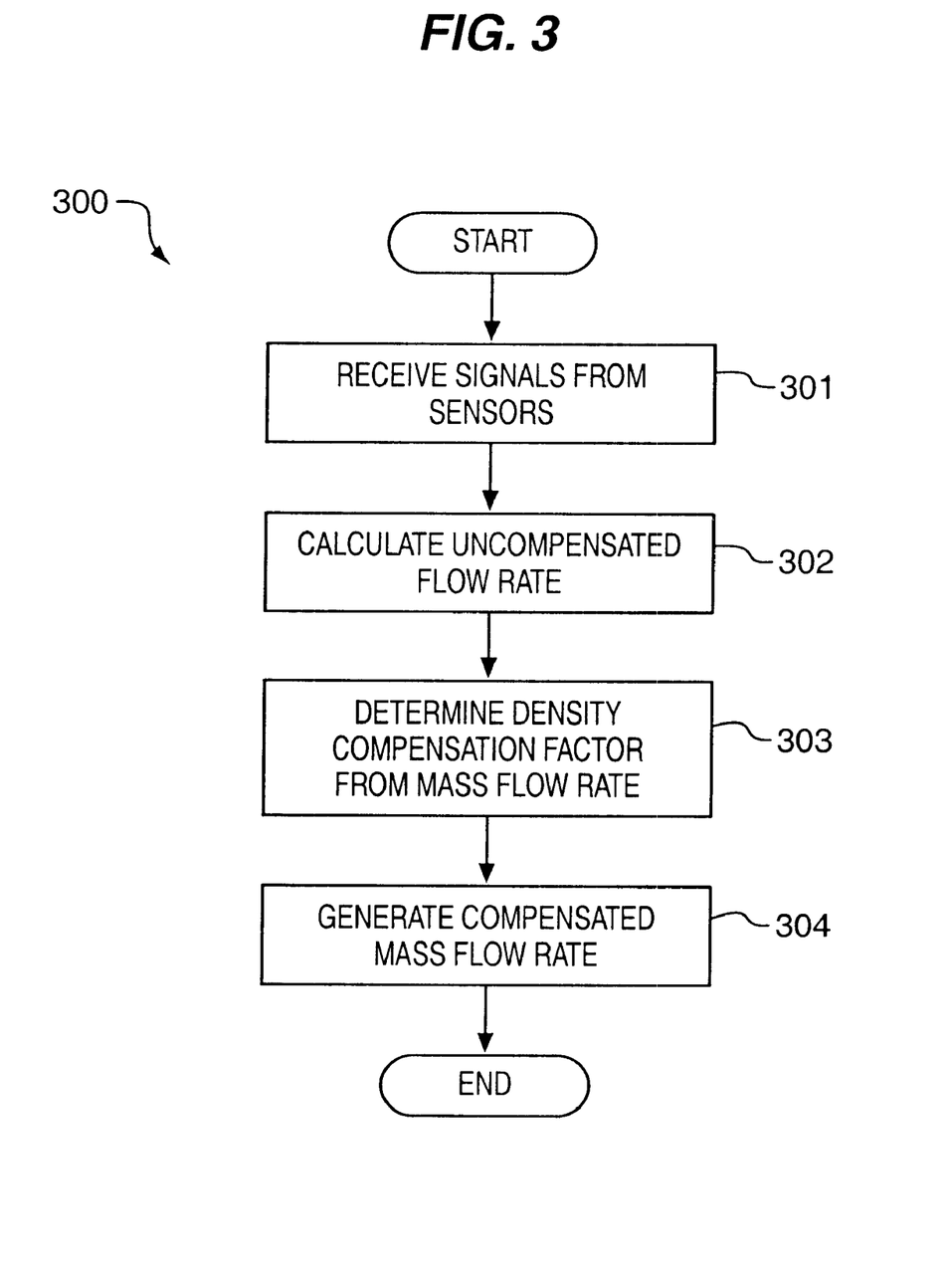
FIG. 3 illustrating a first embodiment of a method for compensating a flow rate for errors caused by density in accordance with this invention.
Figure 4:
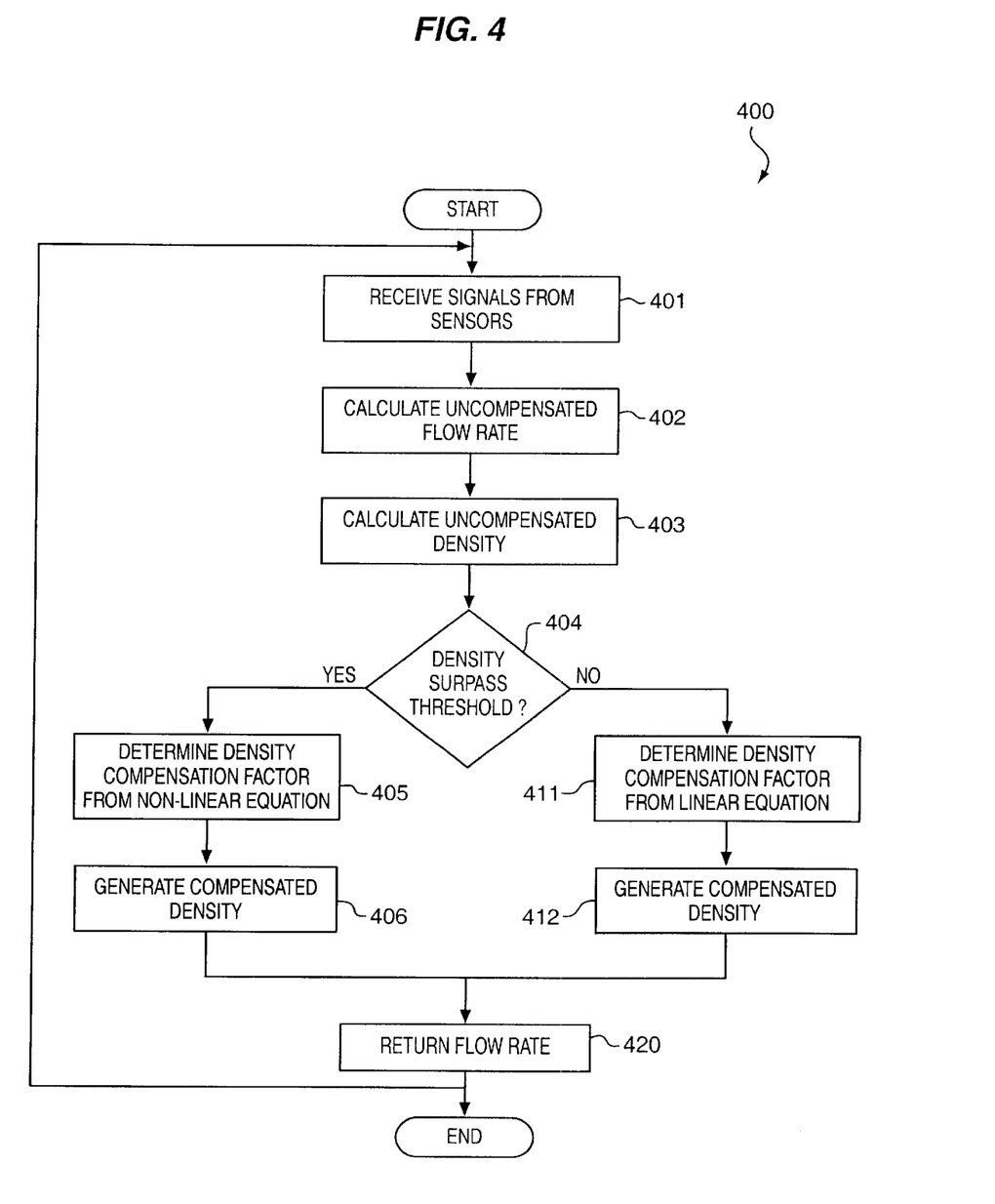
FIG. 4 illustrating a second embodiment of a method for compensating for errors caused by density in accordance with this invention.

The relationship between density and flow rate can then be used to compensate the flow rate for errors caused by density. FIGS. 3 and 4 illustrate alternative processes for providing a flow rate having a density compensation in accordance with the present invention. The process illustrated in FIGS. 3 and 4 are executed by meter electronics 150 or by a secondary processing unit which receives data from meter electronics 150. Process 300 illustrated in FIG. 3 is a first alternative embodiment in accordance with the present invention. In process 300, every flow rate measurement is compensated for density in the following manner.

Process 300 begins in step 301 with signals indicating mass flow rate being received from the sensors affixed to the vibrating conduit. One skilled in the art will recognize that these signals may be the analog signals received directly from the pick-off sensors or the signals may be digital signals representing the phase difference between signals from the sensor. This is a design choice and varies depending on the type of circuitry used to perform the process.

In step 302, an uncompensated flow rate is calculated. The flow rate is calculated in a conventional manner well known in the art and a description of flow rate calculation is omitted for brevity and clarity.

A density compensation factor is then determined in step 303. The density compensation factor may be determined in many different manners. A first solution would be to maintain a memory that stores a flow rate and associated compensation factor or compensated flow rate. A simple look-up could then be performed to determine the compensation factor or compensated flow rate.

A prior art method for determining a compensation factor is a linear or first order curve fit of data. The uncompensated flow rate is inserted into the equation and a proper density compensation factor is determined.

However, a first order curve fit does not provide an accurate representation of the data. Therefore, it is preferable to generate an N order polynomial equation that better fits gathered data to represent the compensation factor. The uncompensated flow rate is then inserted into the equation to solve for the density compensation factor. In a preferred embodiment, it is determined that a $4^{th}$ order polynomial best fits the data and therefore the fourth order equation is used. However, one skilled in the art will recognize that other ordered equations may be used based upon the accuracy of the results.

In the preferred embodiment, it is determined that the following $4^{th}$ order equation best fits the data.

$$DCF=a_0+a_1m+a_2m^2+a_3m^3+a_4m^4$$

where:

$a_0=+0.9983$;

$a_1=+0.0052$;

$a_2=+0.0094$;

$a_3=+0.0051$;

$a_4=-0.0008$; and m=uncompensated flowrate.

A second method for determining a compensation factor is accomplished using a two dimension curve fit to a N order polynomial. A two dimensional curve fit is a curve fit for two variables of data. In this case, the curve fit is for mass flow represented by m and density represented by d. In a preferred embodiment, a least square fit of density and mass flow rate to the compensation factor. Through experimentation of fitting data to various polynomials, it has been determined that a fourth order polynomial fit of density and mass flow rate to the compensation factor as shown in the following equation:

$$\text{compensation factor}=a_0+(a_1+m)+(a_2 \times m^2)+(a_3 \times m^3)+(a_4 \times m^4)+(a_5 \times m \times d)+(a_6 \times d)+(a_7 \times d^2)+(a_8 \times d^3)+(a_9 \times d^4)$$

where:

$a_1,a_2,a_3,a_4,a_5,a_6,a_7,a_8,a_9$=coeffients m=massflowrate d=density.

After the density compensation factor is determined in step 303, the density compensation factor is applied to the uncompensated mass flow rate to generate a density compensated mass flow rate in step 304 and process 300 ends.

Process 400 illustrated in FIG. 4 illustrates a second alternative embodiment for providing a flow rate compensated for errors caused by density. In this embodiment, a density compensation factor may not be applied to the measured flow rate if the density of the material is within a range of densities that do not add unacceptable error to the measured flow rate.

Process 400 begins in step 401 by receiving signals indicating mass flow rate from sensors affixed to a vibrating conduit. The signals are then used to calculate an uncompensated flow rate in step 402. The flow rate is calculated in a conventional manner well known to those skilled in the art.

In step 403, a density of the material is calculated from the signals from a conventional or well known equation such as:

$$p = \frac{p_1 - p_2}{K_2^2 - K_1^2}(\tau^2 - K_1^2) + p1$$

Where p=density of material $p_1$=density of a first known material such as water;

$p_2$=density of a second known material such as air;

$K_1$=constant of the first known material such as water;

$K_2$=constant of the second known material such as air; and

T=rate of oscillation of the flow tube.

After the density is calculated, the calculated density is compared to a threshold density in step 404. The density may surpass the threshold density by being greater than or less than the threshold density. The comparison used is left to those skilled in the art.

If the calculated density surpasses the threshold density, a density compensation factor is determined in step 405. The density compensation factor is determined in the manner described above in step 303 of FIG. 3. The density compensation factor is then applied to the uncompensated mass flow rate and a compensated mass flow rate is generated in step 406.

If the calculated density does not surpass a threshold density, the uncompensated flow rate may be returned in step 420. Alternatively, since it is known that the a linear density compensation may be sufficient, a density compensation may be determined using a linear compensation in step 411. A compensated flow rate is then generated in step 412 by applying the linear density compensation factor to the uncompensated flow rate.

In step 420, the compensated flow rate calculated in step 406 or step 412 is returned and process 400 ends.

What is claimed is:

1. A method for determining a density compensated flow rate of a material flowing through a vibrating conduit comprising the steps of:

receiving signals from sensors affixed to said vibrating conduit;

calculating an uncompensated flow rate of said material from said signals;

calculating a density of said material from said signals;

determining whether said density surpasses a threshold value; and responsive to said density surpassing said threshold value, determining a density compensation factor from said uncompensated flow rate and non-linear information relating said density to errors in flow rate; and generating said density compensated flow rate by applying said density compensation factor to said uncompensated flow rate.

2. The method of claim 1 wherein said threshold value is a psuedo density of 1.030.

3. The method of claim 2 wherein said conduit is 0.130 inches in diameter.

4. The method of claim 1 further comprising the steps of:

determining a linear density compensation factor from said uncompensated flow rate and linear information relating errors in said uncompensated flow rate and said density of said material responsive to said density not surpassing said threshold value; and generating said density compensated flow rate by applying said linear density compensation factor to said uncompensated flow rate.

5. The method of claim 1 wherein said step of determining said density compensation factor comprises the step of:

inserting said uncompensated flow rate into a N order polynomial equation relating said density to flow rate error data wherein N is greater than 1.

6. The method of claim 5 wherein N equals 4.

7. The method of claim 5 further comprising the step of:

performing an N order curve fit of said density to said flow rate error data wherein N is greater than 1 to determine said N order polynomal equation.

8. The method of claim 7 where said step of performing said N order curve fit comprises the step of:

performing a least squares curve fit.

9. The method of claim 1 wherein said step of determining said density compensation factor comprises the step of:

inserting said uncompensated flow rate and said density into a two dimensional N order polynomial equation relating said density to flow rate error data wherein N is greater than 1.

10. The method of claim 9 further comprising the step of:

performing a two dimension N order curve fit of said density and said uncompensated flow rate to said density compensation factor to determine said N order polynomial.

11. The method of claim 10 wherein said step of performing said two dimension N order curve fit comprises the step of:

performing a least square curve fit of data for said uncompensated flow rate and said density to determine said two dimensional N order polynomial.

12. Meter electronics for a Coriolis flowmeter having a processing unit that provides a density compensated flow rate and comprising:

instructions for directing said processing unit to:
receive signals from sensors affixed to a vibrating conduit,
calculate an uncompensated flow rate of said material from said signals,
calculate a density of said material from said signals,
determine whether said density surpasses a threshold value, and
responsive to said density surpassing said threshold value,
determine a density compensation factor from said uncompensated flow rate and non-linear information relating said density to errors in flow rate, and
generate said density compensated flow rate by applying said density compensation factor to said uncompensated flow rate; and a media readable by said processing unit that stores said instructions.

13. The meter electronics of claim 12 wherein said threshold value is a density of 1.030.

14. The meter electronics of claim 12 wherein said instructions further comprise:

instructions for directing said processing unit to:
determine a linear density compensation factor from said uncompensated flow rate and linear information relating errors in said uncompensated flow rate and said density of said material responsive to said density not surpassing said threshold value, and
generate said density compensated flow rate by applying said linear density compensation factor to said uncompensated flow rate.

15. The meter electronics of claim 12 wherein said instructions to determine said density compensation factor comprises:

instructions for directing said processing unit to:
insert said uncompensated flow rate into a N order polynomial equation relating said density to flow rate error data wherein N is greater than 1.

16. The meter electronic of claim 15 wherein said instructions further comprise:

instructions for directing said processing unit to:
perform an N order curve fit of said density to said flow rate error data wherein N is greater than 1 to determine said N order polynomial equation.

17. The meter electronics of claim 16 wherein said instructions to perform said N order curve fit comprises:

instructions for directing said processing unit to perform a least squares curve fit of said density to said flow rate error data.

18. The meter electronics of claim 15 wherein N equals 4.

19. The meter electronics of claim 12 wherein said instructions to determine said density compensation factor comprise:

instructions for directing said processing unit to:
insert said uncompensated flow rate and said density into a two dimensional N order polynomial equation relating said density to flow rate error data wherein N is greater than 1.

20. The meter electronics of claim 19 wherein said instructions further comprise:

instructions for directing said processing unit to:
perform a two dimension N order curve fit of said density and said uncompensated flow rate to said density compensation factor to determine said N order polynomial.

21. The meter electronics of claim 20 wherein said instructions to perform said two dimension N order curve fit comprises:

instructions for directing said processing unit to:
perform a least square curve fit of data for said uncompensated flow rate and said density to determine said two dimensional N order polynomial.

* * * * *

UNITED STATES PATENT AND TRADEMARK OFFICE
CERTIFICATE OF CORRECTION

PATENT NO. : 6,556,931 B1  Page 1 of 2
DATED : April 29, 2003
INVENTOR(S) : Paul J. Hays and Andrew T. Patten It is certified that error appears in the above-identified patent and that said Letters Patent is hereby corrected as shown below:

Column 7,
Lines 26-27, replace "
$$compensation\ factor = a_0 + (a_1 + m) + (a_2 \times m^2)$$
$$+ (a_3 \times m^3) + (a_4 \times m^4) + (a_5 \times m \times d) + (a_6 \times d)$$
$$+ (a_7 \times d^2) + (a_8 \times d^3) + (a_9 \times d^4)$$
"
with --
$$compensation\ factor = a_0 + (a_1 \times m) + (a_2 \times m^2)$$
$$+ (a_3 \times m^3) + (a_4 \times m^4) + (a_5 \times m \times d) + (a_6 \times d)$$
$$+ (a_7 \times d^2) + (a_8 \times d^3) + (a_9 \times d^4)$$
--

Line 54, replace "
$$p = \frac{p_1 - p_2}{K_2^2 - K_t^2}(\tau^2 - K_1^2) + p1$$
"
with --
$$p = \frac{p_1 - p_2}{K_2^2 - K_1^2}(\tau^2 - K_1^2) + p_1$$
--

Line 65, replace "T=rate of oscillation of the flow tube."
with -- $\tau$ = rate of oscillation of the flow tube. --

Column 8,
Line 35, replace "relating said density to errors in flow rate; and" with -- relating density to errors in flow rate; and --
Line 40, replace "a pseudo density of 1.030." with -- a density of 1.030. --
Lines 46-47, replace "relating errors in said uncompensated flow rate and said density of said material responsive to said density not" with -- relating errors in flow rate to density responsive to said density not --
Line 55, replace "polynomial equation relating said density to flow rate" with -- polynomial equation relating density to flow rate --
Line 59, replace "performing an N order curve fit of said density to said" with -- perfoming an N order curve fit of density to --

Column 9,
Line 3, replace "relating said density to flow rate error data where N" with -- relating density to flow rate error data wherein N --
Lines 6-9, replace "performing a two dimension N order curve fit of said density and said uncompensated flow rate to said density compensation factor to determine said N order polynomial." with -- performing a two dimensional N order curve fit of said density and said uncompensated flow rate to determine said N order polynomial. --
Line 11, replace "ing said two dimension N order curve fit comprises the step" with -- ing said two dimensional N order curve fit comprises the step --

UNITED STATES PATENT AND TRADEMARK OFFICE
CERTIFICATE OF CORRECTION

PATENT NO.    : 6,556,931 B1
DATED         : April 29, 2003
INVENTOR(S)   : Paul J. Hays and Andrew T. Patten It is certified that error appears in the above-identified patent and that said Letters Patent is hereby corrected as shown below:

Column 9 (cont'd),
Line 31, replace "tion relating said density to errors in flow rate, and" with -- tion relating density to errors in flow rate, and --
Lines 45-46, replace "relating errors in said uncompensated flow rate and said density of said material responsive to said" with -- relating errors in flow rate to density responsive to said --

Column 10,
Line 9, replace "polynomial equation relating said density to flow" with -- polynomial equation relating density to flow --
Line 14, replace "perform an N order curve fit of said density to said flow" with -- perform an N order curve fit of density to flow. --
Lines 20-21, replace "a least squares curve fit of said density to said flow rate error data." with -- a least squares curve fit --
Line 29, replace "relating said density to flow rate error data wherein" with -- relating density to flow rate error data wherein --
Lines 34-37, replace "perform a two dimension N order curve fit of said density and said uncompensated flow rate to said density compensation factor to determine said N order polynomial." with -- perform a two dimensional N order fit of said density and said uncompensated flow rate to determine said N order polynomial. --
Line 39, replace "instructions to perform said two dimension N order curve fit" with -- instructions to perform said two dimensional N order curve fit --

Signed and Sealed this

Tenth Day of February, 2004

JON W. DUDAS
*Acting Director of the United States Patent and Trademark Office*